United States Patent
Faibish et al.

(10) Patent No.: US 9,582,559 B1
(45) Date of Patent: Feb. 28, 2017

(54) MULTI-SITE STORAGE SYSTEM WITH REPLICATED FILE SYSTEM SYNCHRONIZATION UTILIZING VIRTUAL BLOCK STORAGE APPLIANCES

(75) Inventors: Sorin Faibish, Newton, MA (US); John Bent, Los Alamos, NM (US)

(73) Assignee: EMC IP Holding Company LLC, Hopkinton, MA (US)

( * ) Notice: Subject to any disclaimer, the term of this patent is extended or adjusted under 35 U.S.C. 154(b) by 248 days.

(21) Appl. No.: 13/537,163

(22) Filed: Jun. 29, 2012

(51) Int. Cl.
G06F 17/30 (2006.01)
G06F 7/00 (2006.01)
G06F 11/20 (2006.01)
G06F 11/16 (2006.01)

(52) U.S. Cl.
CPC .... *G06F 17/30575* (2013.01); *G06F 11/1658* (2013.01); *G06F 11/2089* (2013.01); *G06F 17/3048* (2013.01); *G06F 17/30174* (2013.01)

(58) Field of Classification Search
None
See application file for complete search history.

(56) References Cited

U.S. PATENT DOCUMENTS

| | | | |
|---|---|---|---|
| 6,247,099 B1 * | 6/2001 | Skazinski et al. | 711/141 |
| 6,574,709 B1 * | 6/2003 | Skazinski et al. | 711/119 |
| 8,335,899 B1 * | 12/2012 | Meiri et al. | 711/162 |
| 2001/0051955 A1 * | 12/2001 | Wong | 707/201 |
| 2003/0188114 A1 * | 10/2003 | Lubbers et al. | 711/162 |
| 2003/0188218 A1 * | 10/2003 | Lubbers et al. | 714/5 |
| 2005/0182906 A1 * | 8/2005 | Chatterjee | G06F 11/201 711/144 |
| 2005/0229021 A1 * | 10/2005 | Lubbers et al. | 714/2 |
| 2007/0195692 A1 * | 8/2007 | Hagglund et al. | 370/216 |
| 2007/0208783 A1 * | 9/2007 | Midgley et al. | 707/201 |
| 2008/0005614 A1 * | 1/2008 | Lubbers et al. | 714/11 |
| 2008/0091895 A1 * | 4/2008 | Chen | 711/162 |
| 2010/0070725 A1 * | 3/2010 | Prahlad et al. | 711/162 |
| 2010/0274969 A1 * | 10/2010 | Popovski et al. | 711/118 |
| 2013/0339643 A1 * | 12/2013 | Tekade et al. | 711/162 |

OTHER PUBLICATIONS

Feldman, EMC Technical Notes, "Implementation and Planning Best Practices for EMC VPLEX" Oct. 25, 2010 pp. 1-37.*

(Continued)

*Primary Examiner* — Taelor Kim
*Assistant Examiner* — David T Brooks
(74) *Attorney, Agent, or Firm* — Ryan, Mason & Lewis, LLP

(57) ABSTRACT

One or more processing platforms are configured to implement at least a first site of a multi-site storage system. The first site comprises a first file system resident at the first site, and a replicated version of a second file system. The second file system is resident at a second site of the multi-site storage system, and the replicated version of the second file system is resident at the first site. Virtual block storage appliances running on respective virtual machines of the first site interact with one another and with similar appliances at the second site to allow the replicated version of the second file system to be synchronized at a cache level with the second file system, and to allow a replicated version of the first file system at the second site to be synchronized at a cache level with the first file system at the first site.

20 Claims, 3 Drawing Sheets

(56) References Cited

OTHER PUBLICATIONS

Glade, EMC VPLEX 5.0 Architecture Guide White Papet, Apr. 2011, pp. 1-37.*
Peters, "EMC VPLEX: Virtual Storage Beyond Reald Walls" May 10, 2010, pp. 1-6.*
J. Aspesi et al., "EMC VPLEX Metro Witness Technology and High Availability," Version 2.1, EMC Techbooks, Jan. 2012, 136 pages.
J. Aspesi et al., "EMC VPLEX Metro Witness Technology and High Availability," Version 2.0, EMC Techbooks, Sep. 28, 2011, 138 pages.
M. Cram et al., "EMC Vplex Architecture and Deployment: Enabling the Journey to the Private Cloud," Version 1.0, EMC Techbooks, Jun. 2, 2010, 144 pages.

* cited by examiner

MULTI-SITE STORAGE SYSTEM WITH REPLICATED FILE SYSTEM SYNCHRONIZATION UTILIZING VIRTUAL BLOCK STORAGE APPLIANCES

FIELD

The field relates generally to data storage, and more particularly to multi-site storage systems.

BACKGROUND

As the use of public and private clouds becomes increasingly widespread, it is not uncommon for cloud infrastructure to include multi-site storage system arrangements. In such arrangements, a multi-site storage system may be distributed over multiple geographically-dispersed locations. A more particular example of a multi-site storage system is a virtual metro cluster, in which the sites may be within different regions of a metropolitan area or other geographic area and interconnected to communicate with one another via a wide area network (WAN). The different sites may correspond, for example, to different data centers of a business or other enterprise.

In conventional arrangements, each of the sites of the multi-site system may replicate file systems associated with the other sites, so as provide file system recovery capability in the event of failure of one or more of the sites. The remote site file systems that are replicated at the given site are also referred to as mirror file systems. However, in these conventional arrangements, the primary file system of a given site is typically mounted as a read-write file system but the file systems of the remote sites that are replicated as mirror file systems at the given site are typically mounted as read-only file systems.

Such arrangements are used because each primary file system of the multi-site storage system will generally include both cache and disk storage resources, and data written to a file system is held in cache for a certain period of time before it is sent to disk. Accordingly, as the replication of remote file systems generally involves replicating only the disk rather than both the disk and the cache, the conventional arrangements are unable to ensure consistent states between the replicated file system and its corresponding primary file system unless the replicated file system is mounted as a read-only file system.

The above-noted conventional arrangements are therefore unable to provide active-active data access in both primary and replicated file systems, where "active-active" indicates that both primary and replicated file systems of a given site are mounted as read-write file systems. Instead, as indicated previously such multi-site systems are typically configured to utilize "active-passive" data access, in which the primary file system is mounted as a read-write file system but the replicated file system is mounted as a read-only file system.

This represents a significant drawback of conventional practice, in that the file system recovery time after a failure in one of the sites can be unduly long when using an active-passive data access arrangement in a multi-site storage system.

SUMMARY

Illustrative embodiments of the present invention provide improved multi-site storage systems that implement replicated file system synchronization utilizing virtual block storage appliances. For example, such a storage system may comprise a virtual metro cluster for a public or private cloud. The synchronization of the file systems in one or more embodiments may include both disk-level and cache-level synchronization so as to permit active-active data access in the synchronized file systems.

In one embodiment, one or more processing platforms are configured to implement at least one site of a multi-site storage system. The first site comprises a first file system resident at the first site, and a replicated version of a second file system. The second file system is resident at a second site of the multi-site storage system, and the replicated version of the second file system is resident at the first site. First and second virtual block storage appliances running on respective first and second virtual machines of the first site interact with one another and with similar appliances at the second site so as to allow the replicated version of the second file system to be synchronized at a cache level with the second file system, and to allow a replicated version of the first file system at the second site to be synchronized at a cache level with the first file system at the first site.

One or more of the illustrative embodiments described herein exhibit enhanced performance relative to conventional arrangements. For example, these arrangements can provide cache-level synchronization via the virtual block storage appliances, thereby ensuring that both primary and secondary file systems in each site of a multi-site storage system can support full read-write functionality. As a result, file system recovery time after a failure in one of the sites is considerably reduced.

DETAILED DESCRIPTION

Illustrative embodiments of the present invention will be described herein with reference to exemplary multi-site storage systems and associated computers, servers, storage devices and other processing devices. It is to be appreciated, however, that the invention is not restricted to use with the particular illustrative system and device configurations shown. Accordingly, the term "multi-site storage system" as used herein is intended to be broadly construed, so as to encompass, for example, private or public cloud systems distributed over multiple geographically-dispersed locations, as well as other types of storage systems comprising multiple physical sites.

Figure 1:
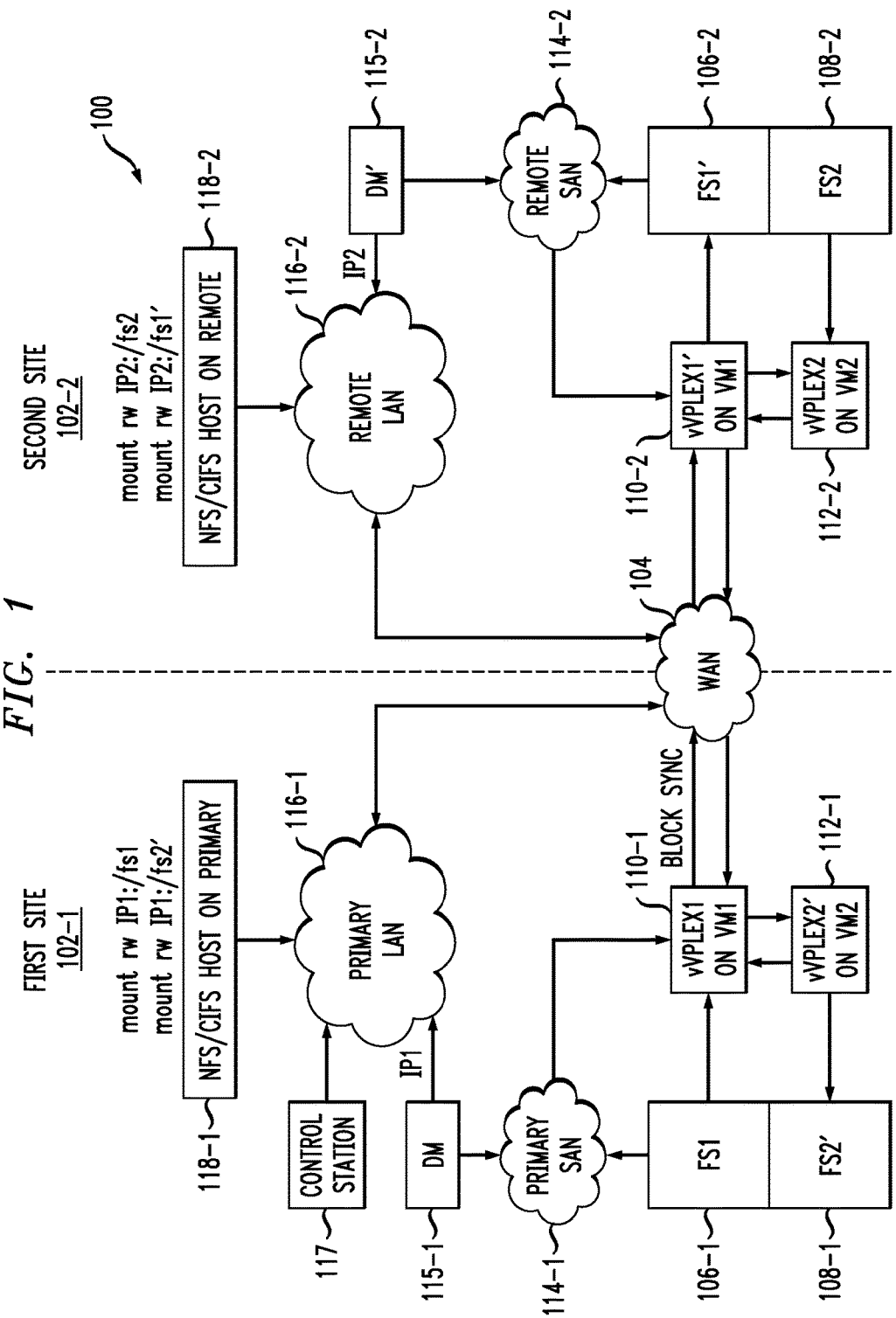
FIG. 1 is a block diagram of a multi-site storage system with replicated file system synchronization in an illustrative embodiment of the invention.

FIG. 1 shows a multi-site storage system 100 configured in accordance with an illustrative embodiment of the present invention. The storage system 100 comprises a first site 102-1 and a second site 102-2 configured to communicate over a network 104, illustratively shown in this embodiment as a WAN. The first and second sites 102-1 and 102-2 are also referred to in the context of the present embodiment as a primary site and a remote site, respectively. The first and second sites may comprise, for example, respective sites of a metropolitan area cluster, or other arrangements of geographically-separated data centers, and may be implemented at least in part in cloud infrastructure.

The storage sites 102 or portions thereof may be implemented using one or more processing devices of at least one processing platform. Examples of processing platforms that may form portions of the storage sites 102 in system 100 will be described in more detail below in conjunction with FIGS. 3 and 4.

Although only two sites 102-1 and 102-2 are shown in the present embodiment, it is to be appreciated that a multi-site storage system in other embodiments may comprise more than two sites, with at least a given one of the sites serving as a primary site relative to multiple remote sites and replicating file systems from each of the remote sites.

The first site 102-1 comprises a first file system 106-1. A replicated version 106-2 of the first file system is resident at the second site 102-2. The first site further comprises a replicated version 108-1 of a second file system 108-2. The second file system 108-2 is resident at the second site 102-2 of the multi-site storage system 100, and the replicated version 108-1 of the second file system 108-2 is resident at the first site 102-1. The first and second file systems are also denoted herein as FS1 and FS2, respectively, and their corresponding replicated versions are denoted FS1' and FS2', respectively. Each of the file systems FS1 and FS2 may be associated with a particular logical unit (LUN) or set of LUNs, and the replicated file systems FS1' and FS2' are configured to mirror the corresponding LUNs.

A replicated file system at a given site may also be referred to herein as a secondary file system of the site. Thus, for example, FS1 may represent a primary file system at site 102-1 and FS2' may represent a secondary file system at that site. It should be noted, however, that other definitions of primary and secondary file systems may be used in other embodiments.

The first site 102-1 further comprises respective first and second virtual block storage appliances 110-1 and 112-1 running on respective first and second virtual machines VM1 and VM2 of the first site. Similarly, the second site 102-2 comprises first and second virtual block storage appliances 110-2 and 112-2 running on respective first and second virtual machines VM1 and VM2 of the second site.

The first file system FS1 and the replicated second file system FS2' are coupled to the first and second virtual block storage appliances 110-1 and 112-1, respectively, within the first site 102-1.

The replicated first file system FS1' and the second file system FS2 are coupled to the first and second virtual block storage appliances 110-2 and 112-2, respectively, within the second site 102-2.

The first and second virtual block storage appliances 110-1 and 112-2 of the first site 102-1 interact with one another and with the similar appliances 110-2 and 112-2 at the second site 102-2 so as to allow the replicated second file system FS2' resident at the first site to be synchronized with the second file system FS2 resident at the second site, and to allow the replicated first file system FS1' resident at the second site to be synchronized with the first file system FS1 resident at the first site.

File system synchronization within the primary and remote file system pairs FS1-FS1' and FS2-FS2' is achieved in the FIG. 1 embodiment at least in part by the first virtual block storage appliances 110-1 and 110-2 of the first and second sites 102-1 and 102-2 exchanging block synchronization information with one another over the network 104 that interconnects the first and second sites.

In the present embodiment, this synchronization includes cache-level synchronization of the synchronized file systems. Thus, the arrangement of virtual block storage appliances 110 and 112 as illustrated in FIG. 1 allows the multi-site system 100 to provide both cache-level and disk-level synchronization, thereby permitting active-active data access in the synchronized primary and remote file systems.

The virtual block storage appliances 110-1 and 110-2 in the present embodiment are more particularly implemented as respective virtual VPLEX appliances denoted vVPLEX1 and vVPLEX1'. Similarly, the virtual block storage appliances 112-2 and 112-1 in the present embodiment are more particularly implemented as respective virtual VPLEX appliances denoted vVPLEX2 and vVPLEX2'. The VPLEX appliances implement virtual storage control functionality using VPLEX components commercially available from EMC Corporation of Hopkinton, Mass.

The file systems of the respective first and second sites 102-1 and 102-2 are associated with respective primary and remote storage area networks (SANs) 114-1 and 114-2 of the first and second sites.

The first site 102-1 further comprises a first data mover 115-1 that is coupled between a primary local area network (LAN) 116-1 and the primary SAN 114-1. Similarly, the second site 102-2 further comprises a second data mover 115-2 that is coupled between a remote LAN 116-2 and the remote SAN 114-2. The first and second data movers 115-1 and 115-2 are respectively denoted as DM and DM' in the figure. The data movers 115-1 and 115-2 have associated Internet Protocol (IP) addresses denoted IP1 and 1P2, respectively.

Also coupled to the primary LAN 116-1 of site 102-1 is a control station 117 and a host 118-1. The second site 102-2 includes a similar host 118-2 but not a control station. The control station 117 serves as a management console for the multi-site system 100. For example, the control station may direct recovery from a failure of a given file system in one of the sites using the replicated file system in the other site.

The hosts 118 are illustratively shown as Network File System (NFS) and/or Common Internet File System (CIFS) hosts, although other types of hosts could be used in other embodiments. The host 118-1 controls mounting of file systems FS1 and FS2' as read-write file systems on IP address IP1, and the host 118-2 controls mounting of file systems FS2 and FS1' as read-write file systems on IP address IP2.

In this embodiment, both file systems FS1 and FS2' on the primary site are mounted as read-write, but one is local to the primary site and the other is replicated from the remote site. Similarly, both file systems FS2 and FS1' on the remote site are mounted as read-write, but one is local to the remote site and the other is replicated from the primary site. The decision of when to update the replicated file systems FS1' or FS2' may be controlled by the respective VPLEX appliances vVPLEX1 running on VM1 at the primary site and vVPLEX2 running on VM2 at the remote site.

Figure 2:
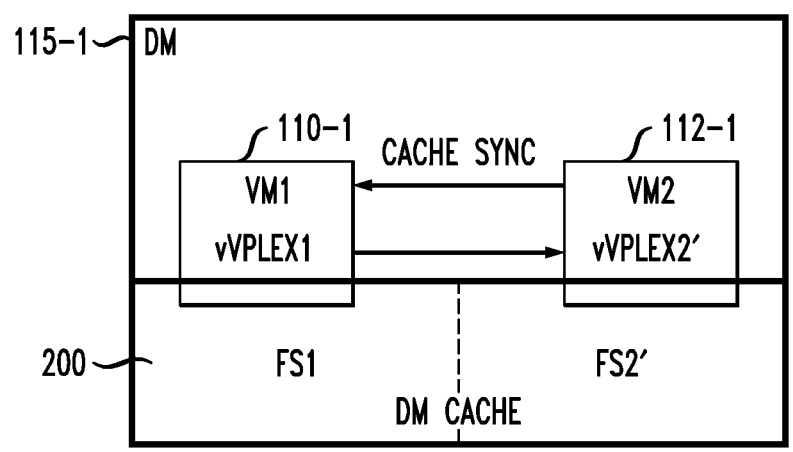
FIG. 2 is a more detailed view of a data mover component of the system of FIG. 1 in an embodiment in which virtual block storage appliances are implemented in the data mover component.

Although illustratively shown as being separate from the data movers 115 in the FIG. 1 diagram, the virtual block storage appliances 110-1 and 112-1 of site 102-1 may be incorporated into data mover 115-1, and the virtual block storage appliances 110-2 and 112-2 of site 102-2 may be incorporated into data mover 115-2. An arrangement of this type is shown in FIG. 2. In the FIG. 2 arrangement, the data mover 115-1 is associated with a cache 200 that includes FS1 and FS2' portions. The first virtual block storage appliance 110-1 is coupled to the FS1 portion of the cache 200 and the second virtual block storage appliance 112-1 is coupled to the FS2' portion of the cache 200. The first and second virtual block storage appliances 110-1 and 112-1 exchange cache synchronization information as indicated.

In this embodiment, the two virtual machines VM1 and VM2 both run inside the data mover 115-1. By way of example, each of these virtual machines may run a Linux operating system and an instance of a VPLEX kernel module application. In such an arrangement, the VPLEX kernel module applications provide the respective vVPLEX1 and vVPLEX2' components shown in the figure.

The second data mover 115-2 of the second site 102-2 may be configured in a similar manner to first data mover 115-1, and accordingly may comprise a cache that includes FS1' and FS2 portions coupled to the respective first and second virtual block storage appliances 110-2 and 112-2 of the second site 102-2. The first and second virtual block storage appliances 110-2 and 112-2 running on the virtual machines VM1 and VM2 of the second site provide the respective vVPLEX1' and vVPLEX2 components.

The virtual block storage appliances 110 and 112 in the present embodiment are implemented at least in part in software running on respective virtual machines within the data movers 115, although numerous other arrangements are possible. It is also assumed that the file systems are configured to support concurrent access by multiple clients on both the primary and remote sites.

The cache synchronization provided by the virtual block storage appliances 110 and 112 of the data movers 115 ensures consistency between the primary and remote file system pairs FS1-FS1' and FS2-FS2'. For example, such an arrangement avoids the inconsistency problems that arise in conventional approaches when data written to a file system is held in cache for a certain period of time before it is sent to disk. Accordingly, the present embodiment avoids the need to mount a replicated file system as a read-only file system.

As indicated previously, in other embodiments the first and second virtual block storage appliances of a given site may be implemented separately from the corresponding data mover of that site. For example, these virtual block storage appliances may be incorporated at least in part into another system element.

The illustrative embodiments described above can provide cache-level synchronization via the virtual block storage appliances, thereby ensuring that both primary and secondary file systems in each site of the multi-site storage system 100 can support full read-write functionality. As a result, significantly faster file system recovery can be achieved after a failure in one of the sites than would be possible using conventional arrangements, and seamless access is provided to all the file system data in the event of unavailability of a given site. In addition, by providing cache-level synchronization, the disclosed arrangements can reduce the frequency at which file system data is required to be flushed to disk.

It is to be appreciated that replicated file system synchronization functionality such as that described in conjunction with FIGS. 1 and 2 can be implemented at least in part in the form of one or more software programs stored in memory and executed by a processor of a processing device such as a computer or server. A memory or other storage device having such program code embodied therein is an example of what is more generally referred to herein as a "computer program product."

Figure 3:
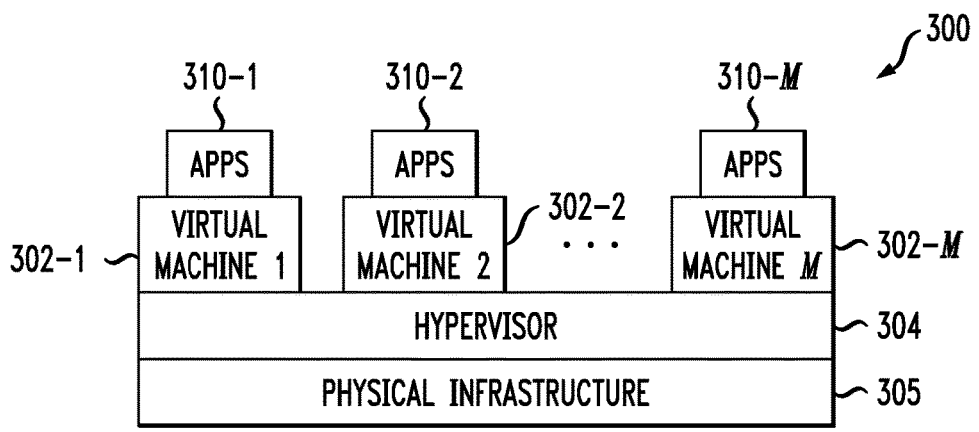
FIGS. 3 and 4 show examples of processing platforms that may be utilized to implement at least a portion of the FIG. 1 system.
Figure 4:
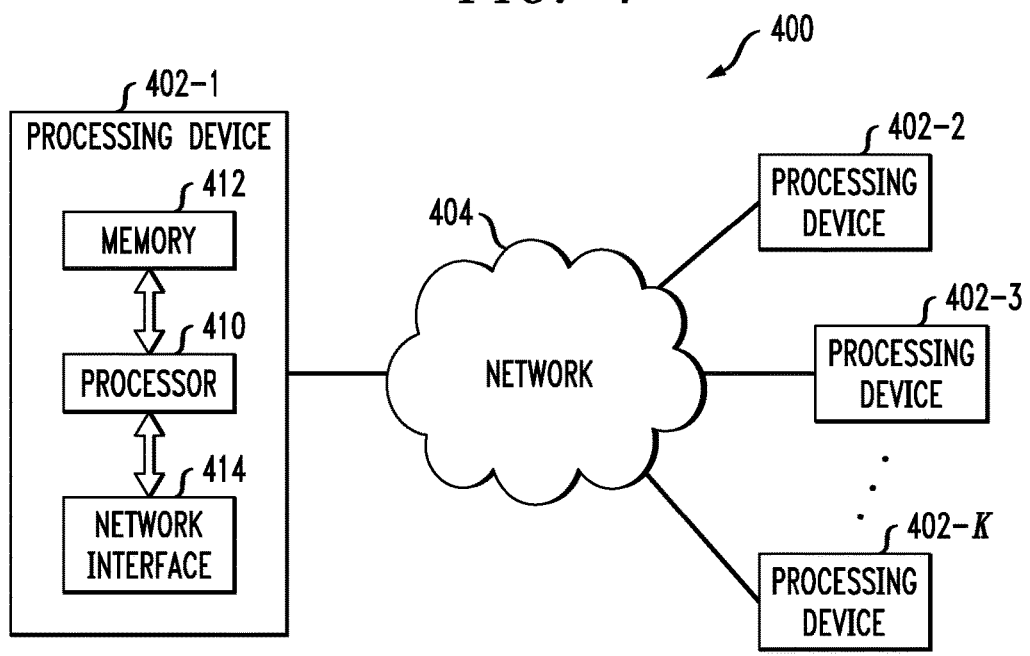

Referring now to FIG. 3, portions of the multi-site storage system 100 in this embodiment comprise cloud infrastructure 300. The cloud infrastructure 300 comprises virtual machines (VMs) 302-1, 302-2, . . . 302-M implemented using a hypervisor 304. The hypervisor 304 runs on physical infrastructure 305. The cloud infrastructure 300 further comprises sets of applications 310-1, 310-2, . . . 310-M running on respective ones of the virtual machines 302-1, 302-2, . . . 302-M under the control of the hypervisor 304. The cloud infrastructure 300 may be viewed as providing an example of what is more generally referred to herein as "virtual infrastructure." The cloud infrastructure 300 may be associated with a particular one of the sites 102-1 or 102-2, although similar cloud infrastructure may be used for both sites. Thus, VM1 and VM2 in site 102-1 or site 102-2 may be viewed as corresponding to particular ones of the virtual machines 302.

Although only a single hypervisor 304 is shown in the embodiment of FIG. 3, the system 100 may of course include multiple hypervisors each providing a set of virtual machines using at least one underlying physical machine.

An example of a commercially available hypervisor platform that may be used to implement hypervisor 304 and possibly other portions of the cloud infrastructure of multi-site storage system 100 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the cloud infrastructure of system 100.

As indicated previously, the system 100 may be implemented using one or more processing platforms. One or more of the processing modules or other components of system 100 may therefore each run on a computer, server, storage device or other processing platform element. A given such element may be viewed as an example of what is more generally referred to herein as a "processing device." The cloud infrastructure 300 shown in FIG. 3 may represent at least a portion of one processing platform. Another example of such a processing platform is processing platform 400 shown in FIG. 4.

The processing platform 400 in this embodiment comprises a portion of the system 100 and includes a plurality of processing devices, denoted 402-1, 402-2, 402-3, . . . 402-K, which communicate with one another over a network 404. The network 404 may comprise any type of network, such as a WAN, a LAN, a satellite network, a telephone or cable network, or various portions or combinations of these and other types of networks.

The processing device 402-1 in the processing platform 400 comprises a processor 410 coupled to a memory 412. The processor 410 may comprise a microprocessor, a microcontroller, an application-specific integrated circuit (ASIC), a field-programmable gate array (FPGA) or other type of processing circuitry, as well as portions or combinations of such circuitry elements, and the memory 412, which may be viewed as an example of a "computer program product" having executable computer program code embodied therein, may comprise random access memory (RAM), read-only memory (ROM) or other types of memory, in any combination.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, servers, storage devices or other processing devices. Multiple elements of multi-site storage system 100 may be collectively implemented on a common processing platform of the type shown in FIG. 3 or 4, or each such element may be implemented on a separate processing platform.

It should again be emphasized that the above-described embodiments of the invention are presented for purposes of illustration only. Many variations and other alternative embodiments may be used. For example, the techniques are applicable to a wide variety of other types of devices and systems that can benefit from the replicated file system synchronization techniques disclosed herein. Also, the particular configuration of system and device elements shown in FIGS. 1-4 can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   at least a first site and a second site of a multi-site storage system;
   the first site comprising:
      a first file system resident at the first site;
      a replicated version of a second file system, the second file system being resident at the second site of the multi-site storage system, the replicated version of the second file system being resident at the first site; and
      first and second virtual block storage appliances running on respective first and second virtual machines of the first site;
   wherein the first site is implemented on at least one processing platform comprising a plurality of processing devices, a given such processing device comprising a processor coupled to a memory;
   wherein the first file system and the replicated version of the second file system are coupled to the first and second virtual block storage appliances, respectively, within the first site;
   wherein the first and second virtual block storage appliances interact with one another and with similar appliances at the second site so as to allow the replicated version of the second file system resident at the first site to be synchronized with the second file system resident at the second site, and to allow a replicated version of the first file system resident at the second site to be synchronized with the first file system resident at the first site;
   wherein the first and second virtual block storage appliances provide cache-level synchronization by synchronizing a cache of the replicated version of the second file system resident at the first site with a cache of the second file system resident at the second site, and synchronizing a cache of the replicated version of the first file system resident at the second site with a cache of the first file system resident at the first site;
   the second site comprising:
      the second file system and the replicated version of the first file system; and
      first and second virtual block storage appliances running on respective first and second virtual machines of the second site;
   wherein the replicated version of the first file system and the second file system are coupled to the first and second virtual block storage appliances, respectively, within the second site;
   wherein the first and second virtual block storage appliances of the second site interact with the first and second virtual block storage appliances of the first site in providing said cache-level synchronization;
   wherein the first virtual block storage appliances of the first and second sites exchange synchronization information over a network that interconnects the first and second sites;
   wherein the first site further comprises a first data mover associated with the cache of the first file system at the first site and the cache of the replicated version of the second file system at the first site;
   wherein the first and second virtual block storage appliances of the first site are respectively and operatively coupled to the cache of the first file system at the first site and the cache of the replicated version of the second file system at the first site;
   wherein the second site further comprises a second data mover associated with the cache of the second file system at the second site and the cache of the replicated version of the first file system at the second site; and
   wherein the first and second virtual block storage appliances of the second site are respectively and operatively coupled to the cache of the second file system at the second site and the cache of the replicated version of the first file system at the second site.

2. The apparatus of claim 1 wherein the synchronization of the synchronized file systems comprises both said cache-level synchronization and disk-level synchronization so as to permit active-active data access in the synchronized file systems.

3. The apparatus of claim 1 wherein the first and second sites comprise respective primary and remote sites coupled together via the network, wherein the network comprises a wide area network.

4. The apparatus of claim 1 wherein the first and second sites comprise respective sites of a metropolitan area cluster.

5. The apparatus of claim 1 wherein the first and second sites comprise respective geographically-separated data centers implemented in cloud infrastructure.

6. The apparatus of claim 1 wherein the first and second file systems are associated with respective storage area networks of the first and second sites.

7. The apparatus of claim 1 wherein each of the virtual block storage appliances is configured to mirror a different logical unit (LUN).

8. The apparatus of claim 1 wherein the first data mover incorporates the first and second virtual block storage appliances.

9. The apparatus of claim 8 wherein the first data mover is coupled between a local area network of the first site and a storage area network of the first site.

10. The apparatus of claim 1 wherein the interaction of the first and second virtual block storage appliances of the first and second sites permits active-active data access to both the first and second file systems at both the first and second sites.

11. The apparatus of claim 1 wherein the first virtual block storage appliances of the first and second sites exchange block synchronization information over the network that interconnects the first and second sites.

12. At least one processing platform comprising cloud infrastructure which incorporates the apparatus of claim 1.

13. A method comprising the steps of:
providing at least a first site and a second site of a multi-site storage system;
configuring the first site to comprise a first file system resident at the first site and a replicated version of a second file system, the second file system being resident at the second site of the multi-site storage system, the replicated version of the second file system being resident at the first site;
running first and second virtual block storage appliances on respective first and second virtual machines of the first site; and
utilizing the first and second virtual block storage appliances in conjunction with similar appliances at the second site to synchronize the replicated version of the second file system resident at the first site with the second file system resident at the second site, and to synchronize a replicated version of the first file system resident at the second site with the first file system resident at the first site;
wherein the first and second virtual block storage appliances provide cache-level synchronization by synchronizing a cache of the replicated version of the second file system resident at the first site with a cache of the second file system resident at the second site, and synchronizing a cache of the replicated version of the first file system resident at the second site with a cache of the first file system resident at the first site;
wherein the method further comprises:
configuring the second site to comprise the second file system and the replicated version of the first file system;
running first and second virtual block storage appliances on respective first and second virtual machines of the second site;
utilizing the first and second virtual block storage appliances of the second site to interact with the first and second virtual block storage appliances of the first site in providing said cache-level synchronization;
wherein the first virtual block storage appliances of the first and second sites exchange synchronization information over a network that interconnects the first and second sites;
configuring the first site to further comprise a first data mover associated with the cache of the first file system at the first site and the cache of the replicated version of the second file system at the first site;
wherein the first and second virtual block storage appliances of the first site are respectively and operatively coupled to the cache of the first file system at the first site and the cache of the replicated version of the second file system at the first site; and
configuring the second site to further comprise a second data mover associated with the cache of the second file system at the second site and the cache of the replicated version of the first file system at the second site;
wherein the first and second virtual block storage appliances of the second site are respectively and operatively coupled to the cache of the second file system at the second site and the cache of the replicated version of the first file system at the second site.

14. The method of claim 13 wherein the interaction of the first and second virtual block storage appliances of the first and second sites permits active-active data access to both the first and second file systems at both the first and second sites.

15. The method of claim 13 wherein said steps are performed by a processing platform comprising a plurality of processing devices, a given such processing device comprising a processor coupled to a memory.

16. The method of claim 13 wherein the first and second sites comprise respective primary and remote sites coupled together via the network, wherein the network comprises a wide area network.

17. The method of claim 13 wherein the first virtual block storage appliances of the first and second sites exchange block synchronization information over the network that interconnects the first and second sites.

18. A computer program product comprising a non-transitory processor-readable storage medium having encoded therein executable code of one or more software programs, wherein the one or more software programs when executed cause a processing platform:
to provide at least a first site and a second site of a multi-site storage system;
configure the first site to comprise a first file system resident at the first site and a replicated version of a second file system, the second file system being resident at the second site of the multi-site storage system, the replicated version of the second file system being resident at the first site;
to run first and second virtual block storage appliances on respective first and second virtual machines of the first site; and
to utilize the first and second virtual block storage appliances in conjunction with similar appliances at the second site to synchronize the replicated version of the second file system resident at the first site with the second file system resident at the second site, and to synchronize a replicated version of the first file system resident at the second site with the first file system resident at the first site;
wherein the first and second virtual block storage appliances provide cache-level synchronization by synchronizing a cache of the replicated version of the second file system resident at the first site with a cache of the second file system resident at the second site, and synchronizing a cache of the replicated version of the first file system resident at the second site with a cache of the first file system resident at the first site;
wherein the one or more software programs when executed further cause the processing platform:
to configure the second site to comprise the second file system and the replicated version of the first file system;
to run first and second virtual block storage appliances on respective first and second virtual machines of the second site;
to utilize the first and second virtual block storage appliances of the second site to interact with the first and second virtual block storage appliances of the first site in providing said cache-level synchronization;
wherein the first virtual block storage appliances of the first and second sites exchange synchronization information over a network that interconnects the first and second sites;

to configure the first site to further comprise a first data mover associated with the cache of the first file system at the first site and the cache of the replicated version of the second file system at the first site;

wherein the first and second virtual block storage appliances of the first site are respectively and operatively coupled to the cache of the first file system at the first site and the cache of the replicated version of the second file system at the first site; and to configure the second site to further comprise a second data mover associated with the cache of the second file system at the second site and the cache of the replicated version of the first file system at the second site;

wherein the first and second virtual block storage appliances of the second site are respectively and operatively coupled to the cache of the second file system at the second site and the cache of the replicated version of the first file system at the second site.

19. The computer program product of claim 18 wherein the interaction of the first and second virtual block storage appliances of the first and second sites permits active-active data access to both the first and second file systems at both the first and second sites.

20. The computer program product of claim 18 wherein the first virtual block storage appliances of the first and second sites exchange block synchronization information over the network that interconnects the first and second sites.

* * * * *